United States Patent [19]

Takahashi et al.

[11] Patent Number: 4,924,725
[45] Date of Patent: May 15, 1990

[54] MECHANISM FOR ADJUSTING HEIGHT OF HANDLE BAR OF PUSHCART

[75] Inventors: Takehiko Takahashi; Hitoshi Kato, both of Tokyo, Japan

[73] Assignee: Combi Co., Ltd., Tokyo, Japan

[21] Appl. No.: 321,681

[22] Filed: Mar. 10, 1989

[30] Foreign Application Priority Data

Oct. 3, 1988 [JP] Japan .................. 63-128788

[51] Int. Cl.⁵ ............................................. B62K 21/16
[52] U.S. Cl. ............................. 74/551.3; 280/47.315; 280/47.371
[58] Field of Search ................. 74/491, 493, 551.3, 74/501.6; 280/491.2, 642, 643, 647, 655, 655.1, 47.315, 47.371, 650; 5/99 A, 99 B, 99 R; 24/541; 403/330, 108, 109

[56] References Cited

U.S. PATENT DOCUMENTS

| | | | |
|---|---|---|---|
| 919,729 | 4/1909 | Kleine | 280/47.371 X |
| 3,084,949 | 4/1963 | Forster et al. | 280/47.371 X |
| 3,933,373 | 1/1976 | Gammelgaard | 74/551.3 |
| 3,998,476 | 12/1976 | Kazmark | 280/47.315 X |
| 4,011,913 | 3/1977 | Davies et al. | 280/47.315 X |
| 4,563,912 | 1/1986 | Parks | 74/493 |
| 4,577,877 | 3/1986 | Kassai | 280/642 X |
| 4,587,864 | 5/1986 | Kassai | 280/47.371 X |
| 4,733,882 | 3/1988 | Kassai | 280/642 X |
| 4,813,693 | 3/1989 | Lockard et al. | 280/47.315 X |
| 4,832,361 | 5/1989 | Nakao et al. | 74/501.6 X |

FOREIGN PATENT DOCUMENTS 2149358  6/1985  United Kingdom .......... 280/47.371

Primary Examiner—Vinh T. Luong
Attorney, Agent, or Firm—Sughrue, Mion, Zinn, Macpeak & Seas

[57] ABSTRACT

A mechanism for adjusting the height of a handle bar for a baby carriage in which upwardly-extending tubular bars are slidably fitted into the end portions of a U-shaped handgrip bar having a hollow tubular construction. A plurality of engaging apertures are formed in the side of each of the upwardly-extending bars adjacent to an upper end and spaced at predetermined intervals. The engaging apertures are connected together by narrow slots. A retainer member is engaged with each of the two end portions of the handgrip bar and is disposed at a position corresponding to the engaging apertures. Inclined flanges projecting from opposite sides of the retainer member are received respectively in inclined slide guide grooves formed in an elevation operating member. The retainer member is moved outwardly and inwardly in a direction perpendicular to the sliding movement of the elevation operating member when the elevation operating member is slid up and down.

2 Claims, 2 Drawing Sheets

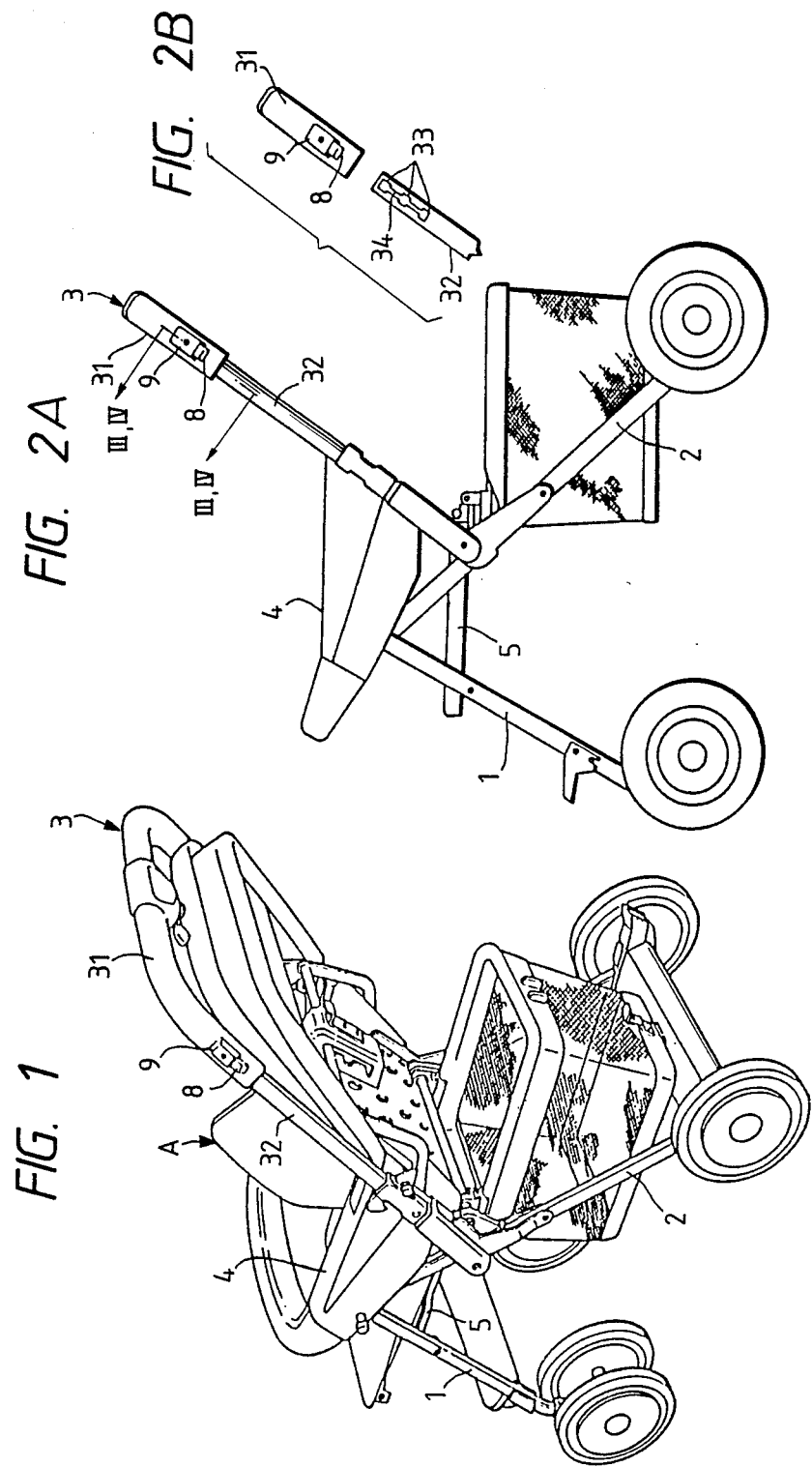

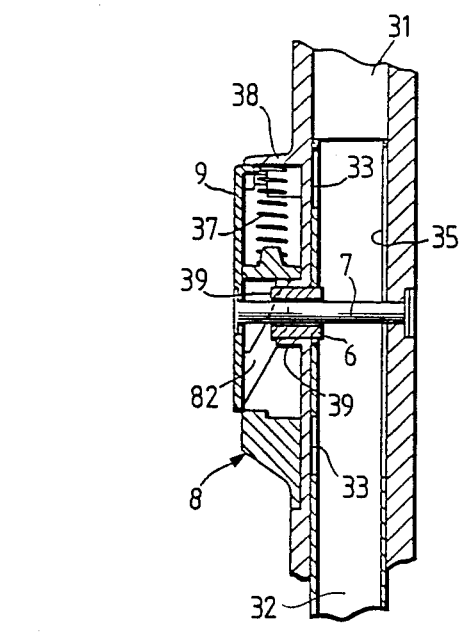
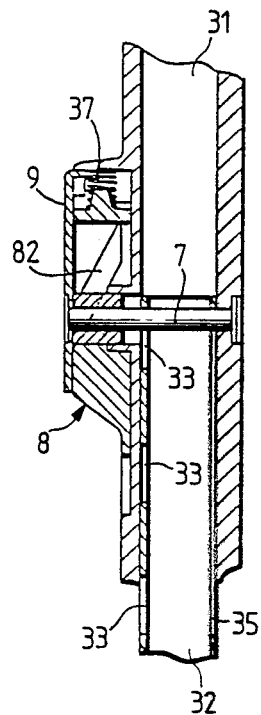
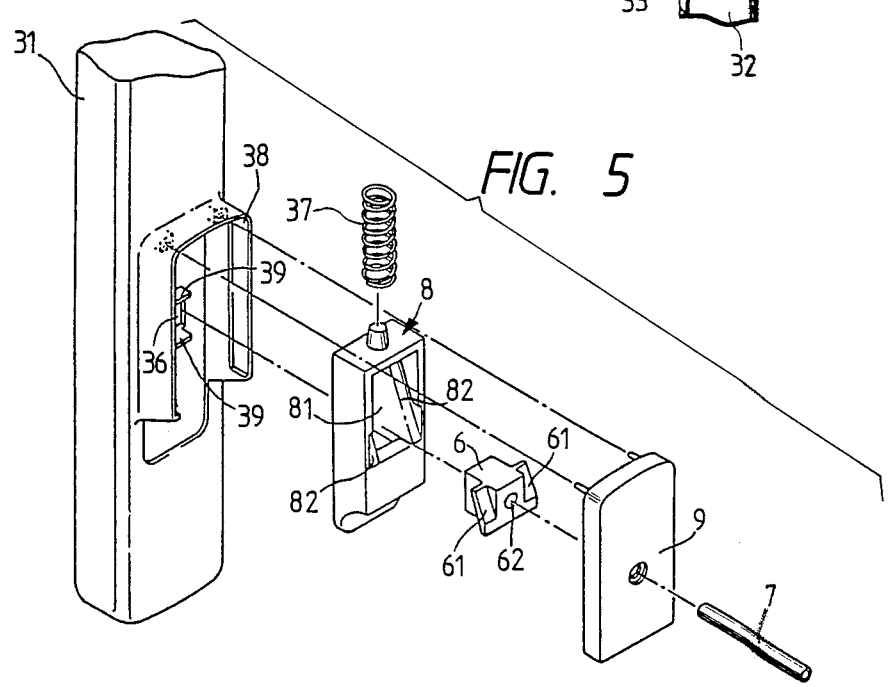

MECHANISM FOR ADJUSTING HEIGHT OF HANDLE BAR OF PUSHCART

BACKGROUND OF THE INVENTION

This invention relates to an improvement on a handle bar mechanism for use in a pushcart such as a baby carriage, and particularly to such a mechanism capable of height adjustment.

When a baby carriage is used, it is common that its user, such as the mother, grips the handle bar and pushes the baby carriage.

Referring to such manner of use, it is desirable that the height of the handle bar, particularly the height of its handgrip, perfectly suit the height of the user. And, in the case where the handle bar is so constructed as to be positioned at the optimum height, the user will not feel fatigued even if pushing the carriage for a long period of time.

On the other hand, in the case in which the position where the handle bar is gripped is higher than the proper position, the user always has to raise both hands higher than the proper position, so that problems such as stiff shoulders are encountered. And, if the position is too low, the user must bend forwardly, so that the user will experience back pain. Thus, it has been pointed out that these problems and others liable to give rise to abnormal physical conditions may develop.

However, generally, the handle bars, employed in the pushcarts now commercially available, have a standing length (standing height) corresponding to the average height of the user and are fixedly mounted on the body of the pushcart. Even in the case of those handle bars of a movable construction, where the position of the handle bar can be moved so as to be positioned on the back side of the baby or in confronting relation to the baby, the standing length (standing height) remains unchanged. Thus, the difference is merely one of such a degree. Therefore, if the height of the mother holding the handle bar is greater than the average height, or smaller than the average height, she has to accept the above-mentioned standard form when using the carriage, so that the problem of fatigue is liable to develop.

Further, even if the user's height is the average height, the user may wish, due to individual preference, to set the position of gripping of the handle bar higher than the standard position or in contrast lower than the standard position. There has been the disadvantage in that such a demand could not be met.

SUMMARY OF THE INVENTION

An object of the present invention is to suitably meet these demands and to provide a mechanism for adjusting the height of a handle bar of a pushcart which enables the height of the handle bar, particularly the height of the handgrip of the handle bar, to be adjustably changed in several steps by quite simple means.

Another object of the invention is to provide a mechanism for adjusting the height of a handle bar of a pushcart which is convenient in that the adjusting operation can be effected by one touch, and the handle bar changed to a selected position can be retained accurately in that position.

The subject matter of the present invention resides in a mechanism for adjusting the height of a handle bar for a pushcart wherein upwardly-extending bars of a tubular construction, having such a size as to be fitted in a handgrip bar are slidably fitted in both end portions of the handgrip bar of a hollow tubular construction having a U-shape as viewed from its front. A plurality of engaging apertures are formed in the side of each of the upwardly-extending bars adjacent to its upper end and spaced at a predetermined interval, the engaging apertures being connected together by connecting slots which are narrower than the engaging apertures. A retainer member is engaged with each of both end portions of the handgrip bar, in which the upwardly-extending bars are fitted, in a slidingly elevatable manner and is disposed at a position corresponding to the engaging apertures. Flanges projecting from opposite sides of the retainer member in inclined relation are received respectively in inclined slide guide grooves formed in an elevation operating member. The retainer member is elevated and descended in a direction perpendicular to the sliding movement of the elevation operating member when the elevation operating member is slidingly moved upwardly and downwardly.

BRIEF DESCRIPTION OF THE DRAWINGS

Other features and advantages of the present invention will be apparent from the following description taken in connection with the accompanying drawings, wherein:

FIG. 1 is a perspective view of a pushcart to which the present invention is applied:

FIG. 2A is a side-elevational view of the pushcart;

FIG. 2B is a fragmentary view showing a handgrip bar and upwardly extending bar constituting a handle bar in an exploded manner;

FIG. 3 is an enlarged fragmentary, cross-sectional view taken along lines III, IV-III, IV of FIG. 2A showing a retainer member fitted in the upwardly extending bar;

FIG. 4 is an enlarged fragmentary, cross-sectional view also taken along line III, IV-III, IV of FIG. 2A, showing the retainer member disengaged from the upwardly-extending bar; and FIG. 5 is an exploded, perspective view of an important portion.

DETAILED DESCRIPTION OF THE PREFERRED EMBODIMENT

The invention will now be described with reference to the drawings.

In the drawings, a pushcart designated at A is a conventional one, and its body comprises front leg bars 1, rear leg bars 2, a handle bar 3, and armrest members 4. A seat plate 5 extends between and is mounted on the front legs 1, 1 and the rear legs 2, 2.

The handle bar 3 is formed of hollow tubular members and is constituted by a handgrip bar 31, having a U-shape as viewed from its front, and upwardly-extending bars 32, 32 which are slidably fitted in both end portions of the handgrip bar 31.

Each of the upwardly-extending bars 32, 32 is formed of a tubular member having such a size as to be fitted in the handgrip bar 31, and has several engaging apertures 33, . . . 33 which are formed in its side adjacent to its upper end, and are spaced at suitable intervals and are of such a size that a retainer member 6 later described is engageable therein. The several engaging apertures 33, . . . 33 are connected together by connecting slots 34 which are narrower than the apertures 33, . . . 33 (see the fragmentary view of FIG. 2B).

A sliding slot 35 having the same width as that of the connecting slot 34 is formed through the side of the upwardly-extending bar 32 disposed opposite to the connecting slots 34 and is further disposed in registry with the engaging apertures 33 and the connecting slots 34, the sliding slot 35 having a length equal to the combined lengths of the engaging apertures 33 and the connecting slots 34.

Numeral 36 denotes an insertion aperture which is formed in the handgrip bar 31 so as to receive the retainer member 6 and is so disposed as to correspond to any of the engaging apertures 33, . . . 33 formed through the upwardly-extending bar 32, and has the same size as that of each engaging aperture 33.

The retainer member 6 is formed as a cubic body as shown in FIG. 5, and has slide guide flanges 61, 61 projecting from opposite sides of the cubic body and inclined in an upward-and-downward direction.

Numeral 62 denotes a shaft hole formed through the retainer member 6 at its center so as to pass a retainer shaft 7 therethrough.

Numeral 39 designates guide walls extending from the peripheral edge portion of the insertion aperture 36 for the retainer member 6. With this construction, the retainer member 6 can be inserted into the insertion aperture 36 and retained therein in a stable manner, and this construction ensures an accurate elevating movement in the insertion aperture 36, and likewise prevents the retainer member 6 from being disengaged from the handgrip bar 31.

Numeral 8 denotes an elevation operating member for guiding the elevating and descending movement of the retainer member 6, and a longitudinal insertion hole 81, for passing the retainer member 6 therethrough in an elevatable manner, is formed through the elevation operating member of a rectangular shape at its central portion.

Numerals 82, 82 denote slide guide grooves for the retainer member 6 and are formed at opposite sides of the insertion hole 81 and have the same inclination as that of the slide guide flanges 61, 61 projected from the opposite sides of the retainer member 6.

Numeral 38 denotes a protective frame for preventing the elevation operating member 8 from becoming disengaged from the handgrip bar 3, and a spring 37 extends between the inner surface of the upper portion of the protective frame 38 and the operating member 8 so as to normally urge the elevation operating member 8 downwardly (as a result of the downward urging of the elevation operating member 8, the retainer member 6 guided by the slide guide grooves 82 is held in its downwardly depressed position).

Numeral 9 denotes a lid plate which prevents the elevation operating member 8 including the retainer member 6 from being disengaged from the handgrip bar 31.

The retainer shaft 7 is passed form the outer surface of the lid plate 9 to the reverse surface of the handgrip bar 31 and is fixed by extending it through the lid plate 9, the retainer member 6, the connecting slot 34 in the upwardly-extending bar 32, the sliding slot 35 and the reverse side of the handgrip 31 and deforming its projected front end by pressing.

The above-mentioned construction according to the present invention operates as follows:

The elevation operating member 8 is normally urged downwardly, so that in the normal condition, the retainer member 6 is fitted in any of the several engaging apertures 33 formed in each of the upwardly-extending bars 32, 32 (see FIG. 3).

In this condition, when it is required to change the height of the handgrip bar 31, first, the elevation operating member 8 is raised by slidingly moving it upwardly against the bias of the spring 37.

When the elevation operating member 8 is raised, the retainer member 6 disposed at the lowermost position of the insertion hole 81 is moved along the inclined surfaces of the inclined slide guide grooves 82 outwardly therefrom.

When the retainer member 6 is moved outwardly along the inclined slide guide grooves 82, the retainer member 6 is disengaged from the engaging aperture 33 in the upwardly-extending bar 31, so that the integral connection between the handgrip bar 31 and upwardly-extending bar 32 is released (see FIG. 4).

In this condition, even if the upward urging of the elevation operating member 8 is released, the retainer member 6 is held in contact with the surface through which the connecting slot 34 is formed since its mating engaging aperture 33 is no longer disposed in registry with the retainer member 6, so that the handgrip 31 can be moved either upwardly or downwardly.

When the handgrip bar 31 is moved, the retainer member 6 disengaged from the engaging aperture 33 is brought into registry with another engaging aperture 33 adjacent to the first-mentioned engaging aperture 33 in accordance with this movement, and then is inserted into that engaging aperture 33 to maintain another retaining condition. Thereby achieving the height adjustment.

When it is desired to further change the height, this can be done by repeating the above procedure.

In this embodiment, although the elevating operation of the retainer member 6 is effected by raising the elevation operating member 8, the invention is not to be restricted to it. The construction may be modified such that this operation is effected in a totally opposite manner, that is, by urging the elevation operating member 8 downwardly. In this case, it will be readily appreciated that the direction of inclination of the slide guide grooves 82 is reversed.

The advantageous effects of the present invention are as follows:

(1) The inclined slide guide grooves 82 are provided at the opposite sides of the insertion hole 81 formed through the elevation operating member 8 at the central portion thereof, and the inclined flanges 61, 61, which are formed at the opposite sides of the retainer member 6, are received in the slide guide grooves 82, respectively. Therefore, when the elevation operating member 8 is held in its lower position by the spring 37, the retainer member 6 is always fitted at its lower portion in the engaging aperture 33 formed in the upwardly-extending bar 32, so that the position of the handgrip 31 can be maintained stably (see FIG. 3).

(2) When it is required to change the height of the handle bar 3 of the pushcart, the elevation operating member 8 in the above-mentioned condition is urged upwardly against the bias of the spring 37, so that the retainer member 6 is moved outwardly with respect to the engaging aperture 33 along the inclination of the slide guide grooves 82 since the flanges 61 projecting from the opposite sides of the retainer member are received in the respective inclined slide guide grooves 82. As a result, the retainer member 6 can easily be disengaged from the engaging aperture 33 formed in the upwardly-extending bar 32, and the height of the handgrip bar 31 can be easily changed.

(3) The retaining flanges 61 formed at the opposite sides of the retainer member 6 are inclined, and the slide guide grooves 82, 82 in which the flanges 61, 61 are received, respectively, are also inclined. Therefore, when the sliding operating member 8 is slidingly moved upwardly and downwardly, the retainer member 6 is moved in a direction perpendicular to the direction of this sliding movement, so that the retainer member 6 can secure the accurate retaining position in a short stroke.

What is claimed is:

1. A mechanism for adjusting the height of a handle bar for a pushcart, said pushcart including a pair of upwardly-extending bars of a tubular construction, a handgrip bar of a hollow tubular construction having a U-shape with a pair of end portions, wherein each of said upwardly-extending bars is slidably fitted into a corresponding one of said end portions of said handgrip, said mechanism comprising:
    a plurality of engaging apertures formed in the side of each of said upwardly-extending bars adjacent to an upper end thereof and spaced at predetermined intervals, said engaging apertures being connected together by connecting slots which are narrower than said engaging apertures;
    a pair of retainer members each being engageable with a corresponding one of said end portions of said handgrip bar, and each being disposed at a position corresponding to said engaging apertures;
    flanges projecting from opposite sides of each said retainer member in inclined relation being received respectively in inclined slide guide grooves formed in an elevation operating member; and
    wherein each said retainer member is moved outwardly and inwardly in a direction perpendicular to the sliding movement of said elevation operating member when said elevation operating member is slidingly moved upwardly and downwardly.

2. A mechanism for adjusting the height of a handle bar for a pushcart according to claim 1, in which said elevation operating member including said retainer member is held by a retainer shaft of which a portion extends through said retainer member, said elevation operating member and said upwardly-extending bar, a front end of said retainer shaft projecting from a reverse surface of said handgrip bar.

* * * * *